United States Patent
Zander et al.

(10) Patent No.: US 10,242,197 B2
(45) Date of Patent: Mar. 26, 2019

(54) METHODS AND APPARATUS TO USE A SECURITY COPROCESSOR FOR FIRMWARE PROTECTION

(71) Applicant: Intel Corporation, Santa Clara, CA (US)

(72) Inventors: Justyna Zander, Gdansk (PL); Marek Zmuda, Rumia (PL); Igor A. Tatourian, Santa Clara, CA (US); Pawel Szymanski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 15/273,997

(22) Filed: Sep. 23, 2016

(65) Prior Publication Data

US 2018/0089435 A1    Mar. 29, 2018

(51) Int. Cl.
  *H04L 29/06* (2006.01)
  *G06F 21/57* (2013.01)

(52) U.S. Cl.
  CPC .......... *G06F 21/575* (2013.01); *G06F 21/572* (2013.01); *G06F 21/577* (2013.01)

(58) Field of Classification Search
  CPC ..... G06F 21/575; G06F 21/572; G06F 21/577
  USPC .......................................................... 726/25
  See application file for complete search history.

(56) References Cited

U.S. PATENT DOCUMENTS

| | | | |
|---|---|---|---|
| 8,117,435 B2 | 2/2012 | Kuang et al. | |
| 8,832,837 B2 | 9/2014 | Muttik | |
| 9,395,968 B1 * | 7/2016 | Nallagatla | G06F 8/654 |
| 2009/0327741 A1 * | 12/2009 | Zimmer | G06F 21/575 |
| | | | 713/183 |
| 2012/0110378 A1 * | 5/2012 | Fan | G06F 11/1658 |
| | | | 714/15 |

(Continued)

FOREIGN PATENT DOCUMENTS

EP    3032412    6/2016

OTHER PUBLICATIONS

International search report for PCT application No. PCT/US2017/047390, dated Nov. 30, 2017 (3 pages).

(Continued)

*Primary Examiner* — Michael S McNally
(74) *Attorney, Agent, or Firm* — Barnes & Thornburg LLP (57) ABSTRACT

A data processing system (DPS) provides protection for firmware. The DPS comprises (a) a host module comprising a management engine and (b) a security module in communication with the host module. The security module comprises a security coprocessor and a secret identifier for the security module. The DPS also comprises at least one machine-accessible medium comprising host firmware and security firmware. The host firmware, when executed by the management engine, enables to management engine to determine whether the security module is in communication with the host module, based on the secret identifier for the security module. The security firmware, when executed by the security coprocessor, enables the security coprocessor (a) to verify integrity of the host firmware and (b) to prevent the host module from booting with the host firmware in response to a determination that the host firmware has lost integrity. Other embodiments are described and claimed.

25 Claims, 4 Drawing Sheets

(56) References Cited

U.S. PATENT DOCUMENTS

2016/0028748 A1    1/2016  Hamid
2016/0162284 A1*   6/2016  Meng ................... G06F 8/665
                                                717/168

OTHER PUBLICATIONS

Written opinion for PCT application No. PCT/US2017/047390, dated Nov. 30, 2017 (11 pages).
Hazan, Issachar, "Understanding AMT, UEFI BIOS and Secure Boot Relationships", retrieved from <https://itpeernetwork.intel.com/understanding-amt-uefi-bios-and-secure-boot-relationships/>, published on Aug. 11, 2013, 15 Pages.
Joseph O., "Getting Started with Intel® Active Management Technology (AMT)", retrieved from <https://software.intel.com/en-us/articles/getting-started-with-intel-active-management-technology-amt>, published on Jun. 7, 2016, 6 Pages.
Wikipedia, "Semiconductor Intellectual Property Core", retrieved from <https://en.wikipedia.org/wiki/Semiconductor_intellectual_property_core>, on Aug. 4, 2016, 4 Pages.
Wikipedia, "Field-Programmable Gate Array", retrieved from <https://en.wikipedia.org/wiki/Field-programmable_gate_array> on Aug. 4, 2016, 14 Pages.
Wikipedia, "Physical Unclonable Function", retrieved from <https://en.wikipedia.org/wiki/Physical_unclonable_function> on Aug. 4, 2016, 5 Pages.
Wikipedia, "Serial Peripheral Interface Bus", retrieved from <https://en.wikipedia.org/wiki/Serial_Peripheral_Interface_Bus> on Aug. 5, 2016, 13 Pages.

* cited by examiner

METHODS AND APPARATUS TO USE A SECURITY COPROCESSOR FOR FIRMWARE PROTECTION

TECHNICAL FIELD

This disclosure pertains in general to security for data processing systems, and in particular to methods and apparatuses which use a security coprocessor for firmware protection.

BACKGROUND

An embedded system is a data processing system that resides within a larger mechanical or electrical entity and that includes one or more different modules for performing one or more dedicated functions, respectively. In addition, one or more of those dedicated functions may need to satisfy real-time computing (RTC) constraints. For instance, functions may need to respond within an order of milliseconds or microseconds.

Many different kinds of entities may include embedded systems. For instance, embedded systems may be used in buildings, in robots, in vehicles, etc. Such vehicles may include, without limitation, conventional cars and trucks, unmanned ("autonomous") cars and trucks, manned aircraft, unmanned aircraft ("drones"), spacecraft, etc. A vehicle, for instance, may include an embedded system that includes a central host module and various auxiliary modules, such as an engine control unit (ECU), tire pressure monitoring sensors (TPMSs), etc. In addition, to implement an advanced driver assistance system (ADAS), the vehicle's embedded system may include modules such as cameras, vision coprocessors, machine-learning modules, etc. For purposes of this disclosure, an entity with an embedded system may be referred to as a "smart entity."

Typically, a module within an embedded system is expected or required to perform one or more specific functions. For instance, an embedded system for a smart vehicle may include an ECU that is expected or required to control an engine and to report various engine performance metrics to a host module. Also, when an embedded system is turned on or activated, one or more of the modules within the system may need to be initialized with software that enables those modules to perform their required functions. In other words, a module may use software to perform one or more functions. For purposes of this disclosure, the software that a module uses may be referred to as "firmware." And each different module may use different firmware. Furthermore, a module may use some parts of its firmware only during the initialization process, and the module may use other parts of its firmware after initialization, during performance of the module's expected or required functions within the embedded system. The portions of firmware that are used for initialization may be referred to as "boot code."

Furthermore, in some situations, it may be desirable to change or update the firmware for one or more modules within an embedded system. However, the failure of one or more modules within an embedded system may cause dangerous or catastrophic results. Consequently, it is important to protect embedded systems from unauthorized updates and from other types of tampering, such as the unauthorized removal or replacement of one or more modules. In other words, it is important to provide protection against network-based attacks and against physical attacks. The present disclosure describes methods and apparatus to provide firmware protection in embedded systems. In particular, the present disclosure describes one or more embedded systems which use a security coprocessor to provide firmware protection.

DESCRIPTION OF EMBODIMENTS

One of the security risks faced by an embedded system is the risk that the code and other data which reside in or flow through the system may be tampered with. For instance, if an attacker were to modify the firmware of one or more components of an embedded system, the attacker could harmfully modify the execution flow of the system. However, there may be a need or desire to apply authorized updates to the firmware of one or more components. Consequently, it is important to prevent unauthorized firmware updates, while allowing for authorized updates.

Another security risk faced by an embedded system is the risk that the design of one or more components of the system may be harmfully modified, for instance by replacing an original component with a compromised component. Another risk is that data may be stolen in real time. Embodiments described herein may address one, some, or all of those risks.

As described in greater detail below, according to the present disclosure, an embedded system may include a host module, a security module, and one or more auxiliary modules. The security module may enforce security policies and monitor the integrity of code and other data used by the host module. For instance, the security module may take priority in the initialization process for the embedded system, and the security module may verify integrity of the firmware for the security module and the firmware for the host module before allowing the boot process to complete. The security module may abort booting if an integrity check fails by replacing the relevant firmware with a back copy and then resetting the relevant module. The security module may also monitor the integrity of the firmware and other data on one, some, or all of the auxiliary modules.

The security module may receive events during the boot sequence, and the security module may determine, based on those events, whether there are safety or security faults that need to be corrected. In addition, the security module 20 may check the integrity of the firmware at any stage after boot, such as in response to an internally-generated heartbeat event, in response to certain external and trusted triggers, or in response to requests from other sources.

The security module may also manage power regulators or power units, shutting down system power to one or more modules if intrusion or some other undesirable behavior has been detected. If the security module disables another module (e.g., by terminating power to that other module), the disabled module may be referred to as having been removed from the network. Also, for purposes of this disclosure, terms like "module," "device," and "component" may be used interchangeably.

In addition, the security module may be tightly coupled to the host module, as described in greater detail below.

Figure 1:
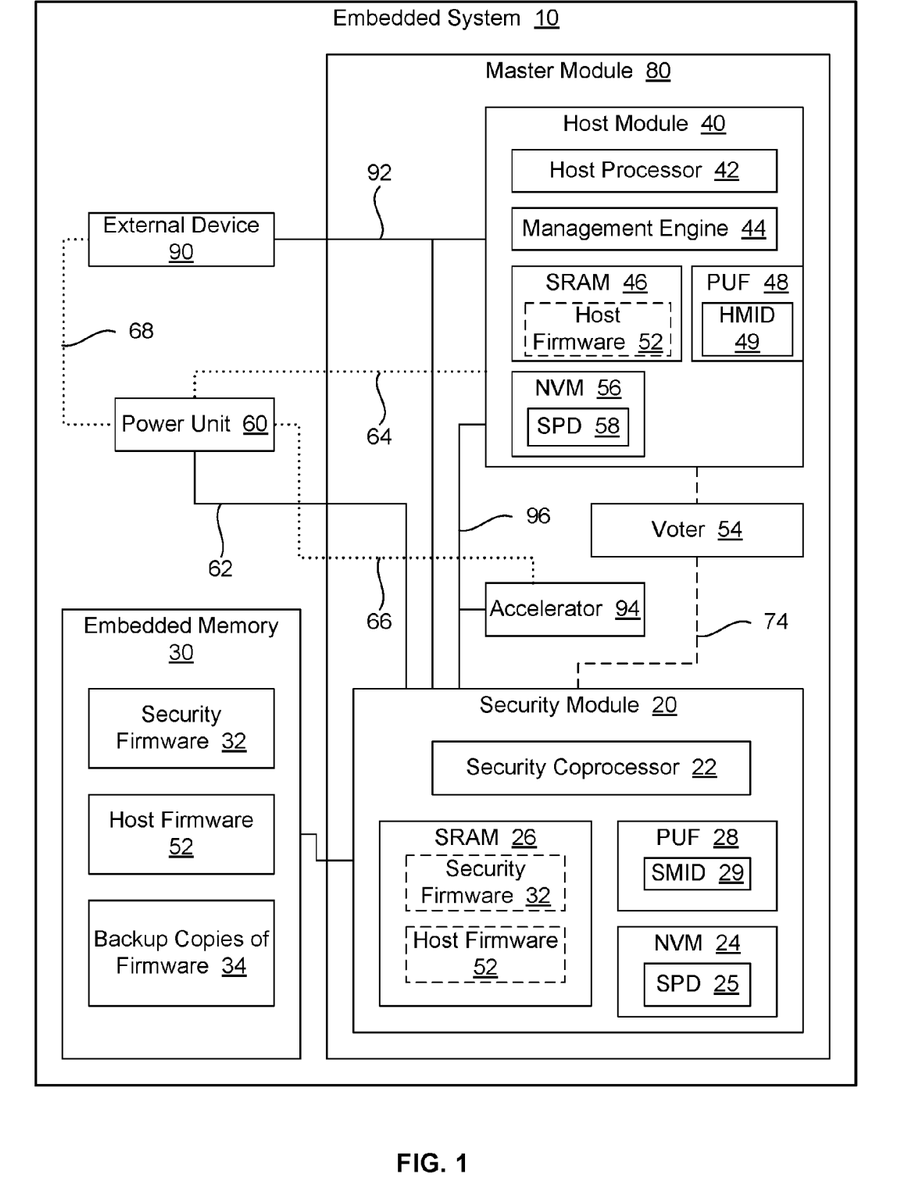
FIG. 1 is a block diagram of an example embodiment of an embedded system with firmware protection.

FIG. 1 is a block diagram of an example embodiment of an embedded system 10 with firmware protection. In the embodiment of FIG. 1, embedded system 10 is a data processing system that includes a host module 40, a security module 20, embedded memory 30, a power unit 60, and various auxiliary devices. Other embodiments may also include different numbers and types of modules, such as multiple power units, additional or fewer auxiliary devices, etc.

In the embodiment of FIG. 1, the auxiliary devices include an external device 90 and an accelerator 94. External devices may include, without limitation, cameras, radar units, lidar units, tire pressure monitor sensors, engine control units (ECUs), etc. Accelerators may include, without limitation, vision coprocessors, machine-learning coprocessors, etc. Auxiliary devices may be implemented using field-programmable gate arrays (FPGAs), digital signal processors (DSPs), application specific integrated circuits (ASICs), and any other suitable technology.

Host module 40, security module 20, and accelerator 94 may be different design blocks within a single integrated circuit, or different integrated circuits within a package of integrated circuits. Master module 80 represents such an integrated circuit or package of integrated circuits.

In other embodiments, host modules and security modules may reside in different packages. Also, in one embodiment, the host module is implemented as a system-on-a-chip (SoC) or a system-on-a-package (SoP), and the security module is implemented as an FPGA. However, in other embodiments other technologies may be used to implement the host module and the security module.

As described in greater detail below, security module 20 includes a security coprocessor 22, static random access memory (SRAM) 26, and a secret identifier for security module 20. FIG. 1 depicts that secret identifier as security module identifier (SMID) 29, within a physical unclonable function (PUF) 28.

As described in greater detail below, host module 40 includes a host processor 42, a management engine 44, and a secret identifier 49 for the host module 40. FIG. 1 depicts that secret identifier as host module identifier (HMID) 49 within PUF 48. Management engine 44 may be implemented as a Converged Security and Manageability Engine (CSME) or as any other suitable technology.

Master module 80 also includes various communication lines to enable modules to communicate with each other. In the embodiment of FIG. 1, those lines include a set of two, three, or more redundant lines 74 which are controlled by a voter 54 that prevents data from reaching host module 40 unless a majority of redundant lines 74 are carrying the same data in sync. In the embodiment of FIG. 1, each of the lines of redundant lines 74 is controlled by a separate microprocessor, and voter 54 monitors all of those lines to make sure that embedded system 10 has not been tampered with. Furthermore, if voter 54 detects data that does not match, voter 54 may cause one or more of the relevant modules to perform remedial measures, such as running a self-test routine to determine why a line is out of whack, performing a reset, etc. In other embodiment, the voter may reside in different locations. For instance, the voter may reside in the management engine of the host module or inside a small Trusted Execution Environment (TEE) within an external device or an accelerator.

Embedded system 10 also includes additional communication lines to enable security module 20 and host module to communicate with external device 90, power unit 60, etc. For instance, communication line 92 enables security module 20 and host module 40 to communicate with external device 90, while communication line 96 enables security module 20 and host module 40 to communicate with accelerator 94. Also, communication line 62 enables security module 20 to control which devices power unit 60 will send power to. Accordingly, dashed lines 64, 66, and 68 illustrate that security module 20 can cause power unit 60 to terminate power to host module 40, accelerator 94, and external device 90, respectively. In addition or alternatively, modules may communicate wirelessly. Embedded system 10 may also be referred to as an "embedded network." Each module may also include one or more communications ports to enable that module to communicate with other modules in the network.

When embedded system 10 powers up or resets, some or all of the modules and devices may perform initialization processes. For example, host processor 42 may execute boot code within host firmware 52, and security coprocessor 22 may execute boot code within security firmware 32. However, as described in greater detail below, in one embodiment, security module 20 holds host module 40 and some or all other devices in a reset state until security coprocessor 22 finishes some or all of its boot process. Alternatively, security module 20 may prevent some or all other modules and devices from receiving power from power unit 60 until security coprocessor 22 finishes some or all of its boot process.

In the embodiment of FIG. 1, host firmware 52 and security firmware 32 reside in embedded memory 30. However, host processor 42 may obtain host firmware 52 via security module 20. For instance, as described in greater detail below, before security module 20 allows host module 40 to boot, security module 20 may validate host firmware 52. After security module 20 validates host firmware 52 security module 20 may allow host module 40 to boot, and host module 40 may then retrieve host firmware 52 from a source that appears to host module 40 as flash memory such as embedded memory 30. However, security module 20 may actually serve as that source. For instance, security module 20 may store the validated host firmware 52 in SRAM 26, and security module 20 may service the read requests that host module 40 directs to embedded memory. Thus, security module 20 may serve as virtual flash memory for host module 40. For example, security module 20 may use NVM 24 to emulate secure flash or Serial Peripheral Interface (SPI) flash for host module 40. Accordingly, host firmware 52 is illustrated with a dashed outline in SRAM 26 and in SRAM 46.

In an alternative embodiment, the security module may validate the host firmware and then copy the host firmware into nonvolatile memory (NVM) in the host module before allowing the host module to boot. In another alternative embodiment, a master module may include dual input/output (I/O) flash memory in communication with the security processor and the host processor, and the host firmware may reside in that flash memory. After the security module validates the host firmware, the host processor may obtain the validated host firmware from that flash memory. In other embodiments, the security firmware may be stored in internal NVM of the security module 20 or in external one-time programmable (OTP) memory.

Additionally, in the embodiment of FIG. 1, security module 20 includes NVM 24, and the manufacturer of master module 80 has loaded security policies and data (SPD) 25 in NVM 24. SPD 25 includes data to enable security firmware 32 to verify the integrity of security firmware 32 and the integrity of host firmware 52. For instance, SPD 25 may include a hash of security firmware 32, a hash of host firmware 52, and copy of HMID 49. In addition, SPD 25 may include hash values or other data to enable security firmware 32 to verify the integrity of one, some, or all of the auxiliary modules. In addition, NVM 24 may be implemented as secure storage. And security module 20 may obtain security firmware 32 from NVM 24 in an alternative embodiment. Similarly, host module includes NVM 56, and the manufacturer may populate NVM 56 with SPD 58. SPD may include, for instance, a copy of SMID 29. As indicated below, host processor 42 may subsequently use that copy of SMID 29 to determine whether the authorized security module is still connected to host module 40.

In the embodiment of FIG. 1, the manufacturer has preconfigured security module 20 with SMID 29 to be produced by PUF 29. The manufacturer has also preconfigured host module 40 with HMID 49 to be produced by PUF 48. In one embodiment, SMID 29 is a unique device identifier that is stored in security module 20, and HMID 49 is a unique device identifier that is stored in host module 40. PUF 29 may be implemented, for instance, with fuses in security module 20 that the manufacturer uses to burn the given SMID into security module 20. Consequently, SMID 29 may be unchangeable but also undetectable to unauthorized entities. HMID 49 may be implemented in a similar manner.

As described in greater detail below, security module 20 may check HMID 49 to make sure that host module 40 has not been disabled or replaced with different hardware, and host module 40 may check SMID 29 to make sure that security module 20 has not been disabled or replaced with different hardware. Thus, SMID 29 and HMID 49 are used to ensure a tightly coupling between host module 40 and security module 20.

Also, during system provisioning, security module 20 may generate a unique master key that will be used to establish secure communication between security module 20 and host module 40. Alternatively, such a master key may be generated and inserted or stored in security module 20 and host module 40 by a certified and secure tool.

In the embodiment of FIG. 1, the manufacturer has also preconfigured embedded memory 30 with security firmware 32 and host firmware 52, as well as backup copies of firmware 34. Those backup copies may include copies of host firmware 52 and security firmware 32, as well as copies of firmware for one, some, or all auxiliary modules, such as external device 90 and accelerator 94. Furthermore, the backup copies may be stored in an encrypted form, so that only security module 20 can decrypt them.

In addition, when any firmware is updated to a new version, security coprocessor 22 may save a copy of the old version as a backup copy 34, and security coprocessor 22 may save the hash value for the old version in SPD 25. Such a hash value may be referred to as a backup hash value. Security module 20 thus maintains a secure store and versioning of the firmware.

Figure 2A:
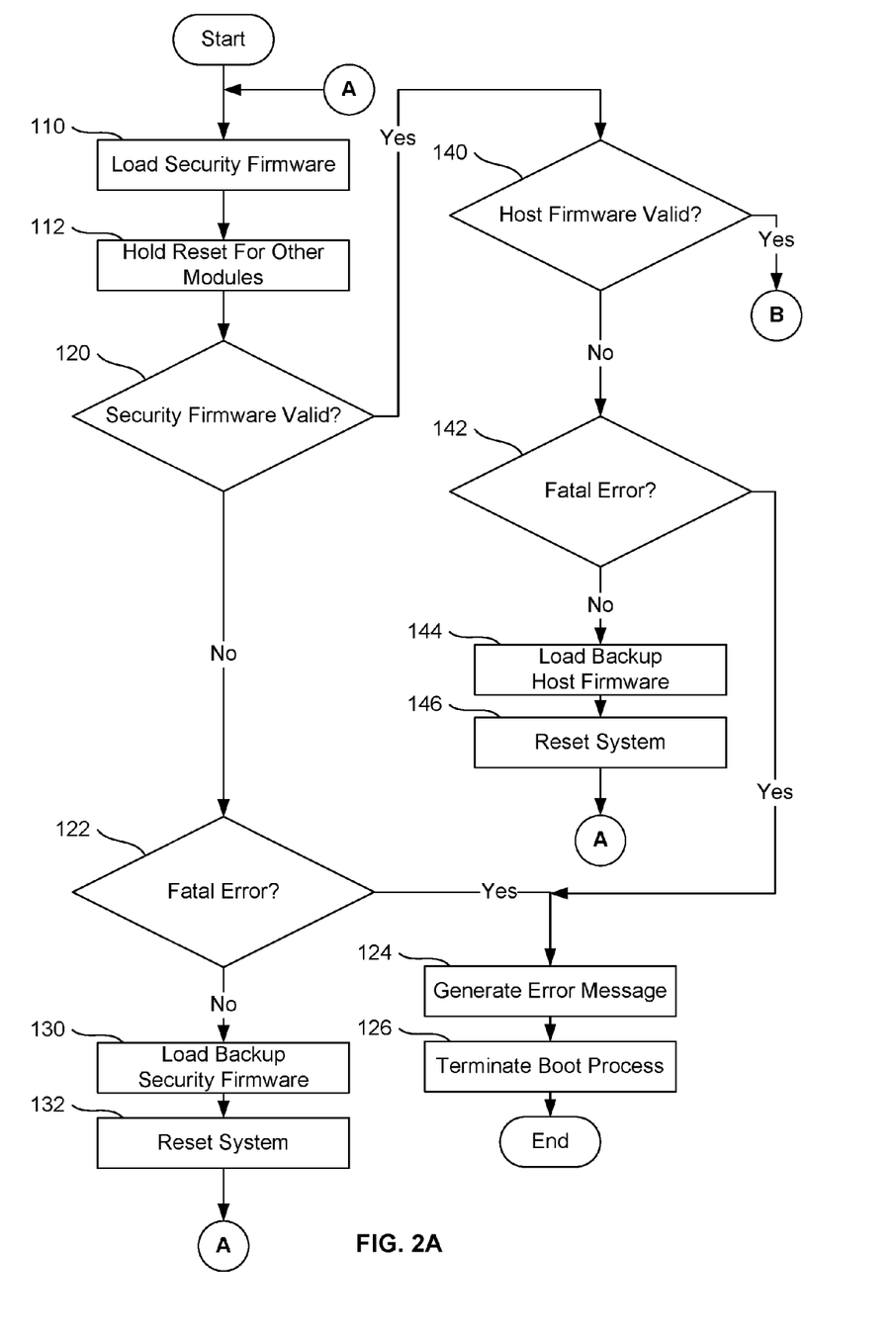
FIGS. 2A and 2B present a flowchart of an example process to protect firmware in an embedded system, with at least some operations to be performed by a security module.
Figure 2B:
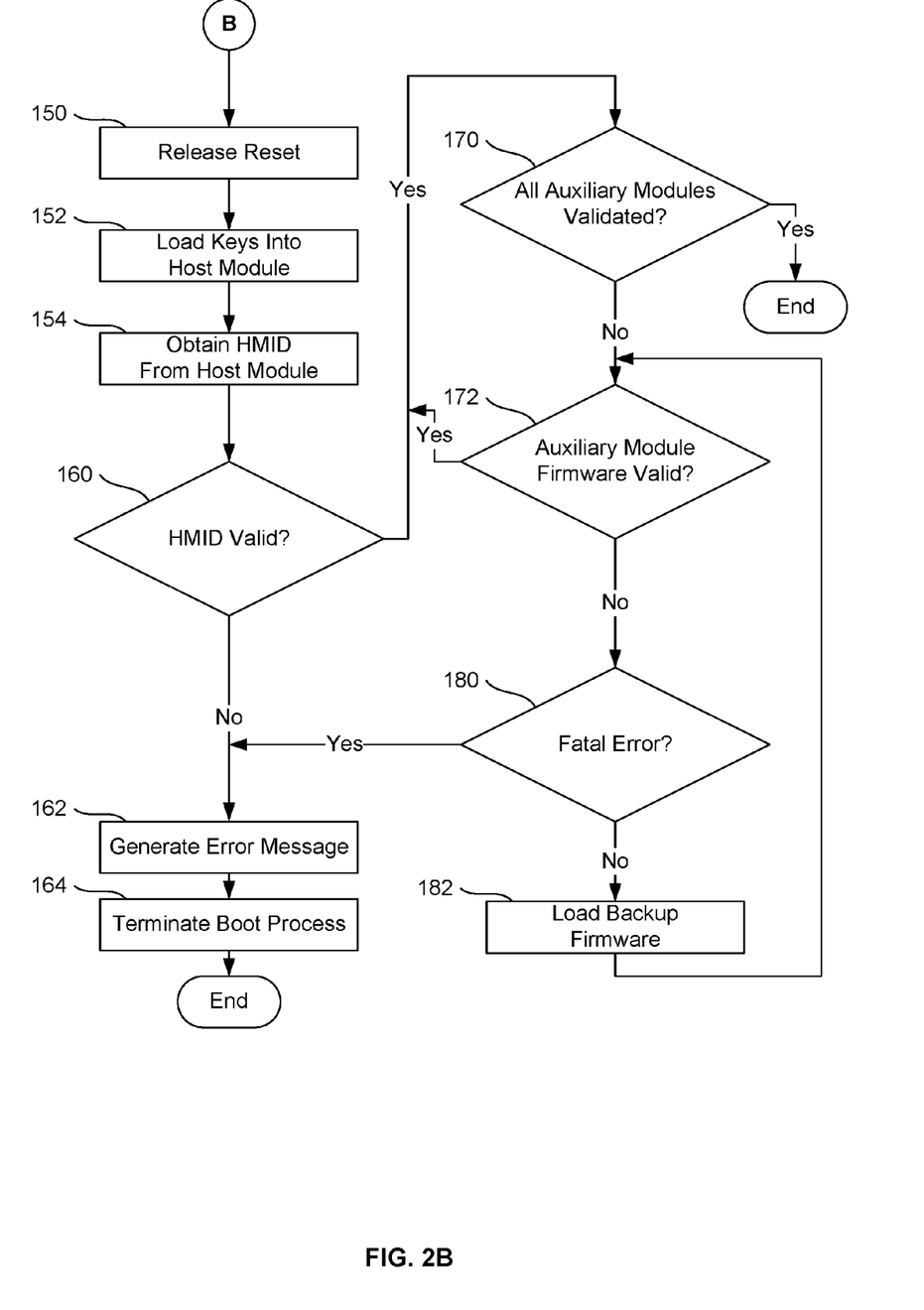

FIGS. 2A and 2B present a flowchart of an example process to provide firmware protection in embedded system 10, with at least some operations to be performed by security module 20. The process of FIG. 2A may start with embedded system 10 being started or powered up.

As shown at block 110, when security module 20 first receives power, security coprocessor 22 may load security firmware 32 into SRAM 26 as shown at block 110. In addition, as shown at block 112, security coprocessor 22 may hold host processor 42 and one, some, or all of the auxiliary modules in a reset state, as shown at block 112. Security coprocessor 22 may then check the integrity or validity of security firmware 32 as shown at block 120. For instance, security coprocessor 22 may hash security firmware 32 and compare the result to the corresponding data in SPD 25. If the integrity check fails, security coprocessor 22 may determine whether that failure should be considered a fatal error, as shown at block 122. For instance, if security coprocessor 22 has already attempted to boot to backup security firmware, and that attempt was unsuccessful (e.g., due to another integrity check failure), security coprocessor 22 may raise a fatal error. If a fatal error is detected or raised, security coprocessor 22 may generate an appropriate error message (for instance, by causing a warning light to illuminate), and security coprocessor 22 may then terminate the boot process, as shown at blocks 124 and 126.

However, if a fatal error has not been detected or raised, security coprocessor 22 may replace security firmware 32 with a backup copy 34 of the security firmware from embedded memory 30, as shown at block 130. Security coprocessor 22 may then reset embedded system 10, as shown at block 132. Consequently, the process may return to block 110 via connector A, with security coprocessor 22 then holding other modules in a reset state, loading the (backup copy of) security firmware into SRAM 26, and verifying that firmware, as described above. Security coprocessor 22 may use the appropriate backup hash value to make that determination.

If the security firmware passes the integrity check, security coprocessor 22 may then check the integrity or validity of host firmware 52, as shown at block 140. If the integrity checks out, the process may then pass through connector B to FIG. 2B. However, if host firmware 52 fails the integrity check, security coprocessor 22 may then determine whether that failure should be considered a fatal error, as shown at block 142. For instance, if security coprocessor 22 has already replaced host firmware 52 with backup host firmware, and that backup firmware has failed the integrity check, security coprocessor 22 may raise a fatal error. If a fatal error is detected or raised, security coprocessor 22 may generate an appropriate error message (for instance, by causing a warning light to illuminate), and security coprocessor 22 may then terminate the boot process, as shown at blocks 124 and 126.

However, if security coprocessor 22 determines that the integrity failure is not a fatal error, security coprocessor 22 may replace host firmware 52 with a backup copy 34 of the host firmware from embedded memory 30, as shown at block 144. Security coprocessor 22 may then reset embedded system 10, as shown at block 146. Consequently, the process may return to block 110 via connector A, with security coprocessor 22 then executing the relevant operations described above and eventually determining at block 140 whether the backup copy of the host firmware is valid. Security coprocessor 22 may use the appropriate backup hash value to make that determination.

As indicated above, if the integrity checks out, the process may then pass through connector B to FIG. 2B. As shown at block 150, security coprocessor 22 may then clear the reset signals for host module 40 and for the auxiliary modules.

As shown at block 152, security coprocessor 22 may then copy wrapped keys to host module 40. Host module 40 may subsequently use those keys for session management and to encrypt or decrypt additional application code. As shown at block 154, security coprocessor 22 may then obtain HMID 49 from host module 40. The request for HMID 49 may be referred to as a challenge. In response to that challenge, host module 40 may use one of the keys from security module 20 (or a key based on one of those keys) to encrypt HMID 49 before sharing HMID 49 with security module 20. As shown at block 160, security coprocessor 22 may then determine whether HMID 49 is valid (after first decrypting HMID 49, if necessary). For instance, security module 20 may compare HMID 49 with the copy of the HIMD that is securely stored in SPD 25. If HMID 49 is not valid (or if security module 20 is unable to obtain an HMID from host module 40) security module 20 may generate an error message and terminate the boot process, as shown at blocks 162 and 164. In addition or alternatively, security module 20 may respond to a determination that host module 40 is not in communication with security module 20 by performing one or more of the following operations: causing host module 20 to reset; causing host module 20 to be removed from the network; causing diagnostics to be performed on host module 20; causing diagnostics to be performed on security module 40; and causing host module 20 to be disabled.

If HMID 49 is valid, security module 20 may then check the integrity of the firmware for one, some, or all of the auxiliary modules. For instance, as shown at blocks 170 and 172, security module 20 may loop through a process of checking the firmware for each auxiliary module to determine whether the firmware is valid (e.g., based on predetermined hash values for the firmware). If any of that firmware is invalid, security module 20 may determine whether a fatal error should be raised, as shown at block 180. For instance, if security coprocessor 22 has already replaced firmware in an auxiliary module with backup host firmware, and that backup firmware has failed the integrity check, security coprocessor 22 may raise a fatal error. If a fatal error is detected or raised, security coprocessor 22 may generate an appropriate error message, and security coprocessor 22 may then terminate the boot process, as shown at blocks 162 and 164.

If the error is not fatal, security coprocessor 22 may replace the firmware in the auxiliary module with backup firmware, as shown at block 182. The process may then return to block 172, with security coprocessor 22 checking the backup firmware, as indicated above.

Referring again to block 170, once the firmware for all of the auxiliary modules has been validated, the initialization process managed by security coprocessor 22 may end. However, as indicated below, host module 40 may also perform an initialization process. Auxiliary modules may also complete initialization processes.

In addition, as indicated above, security module 20 may check the integrity of one, some, or all of the firmware images at any stage after boot, such as in response to an internally-generated heartbeat event, etc.

In some embodiments, one or more auxiliary modules may need to boot very quickly on the embedded network. For instance, some microcontroller units (MCUs) and some sensors in a car or a plane may need to boot quickly. Consequently, the security module may perform a delayed integrity check on those auxiliary modules. In other words, the security module may allow those modules to boot independently by not hold them in a reset state but instead allowing them to boot before checking the integrity of their firmware. However, the security module may configure the embedded system to place those modules in an untrusted state. When a module is in an untrusted state, it may operate in a read-only mode, for instance. In other words, until the integrity check completes successfully, the module will only be allowed read-mode access to the network, to prevent the module from infecting other modules. However, once the security module has finished booting, it may read firmware from the auxiliary modules that booted independently, and the security module may then run integrity checks on that firmware. For example, the security module may compute hashes and compare the results against hashes or signatures. If the integrity is good, the security module may then switch the auxiliary modules into a trusted state. For instance, the security module may enable those modules to read and write. However, if the integrity of such an auxiliary module is not good, the security module may replace the firmware of that auxiliary module with a backup version and reset that auxiliary module.

Figure 3:
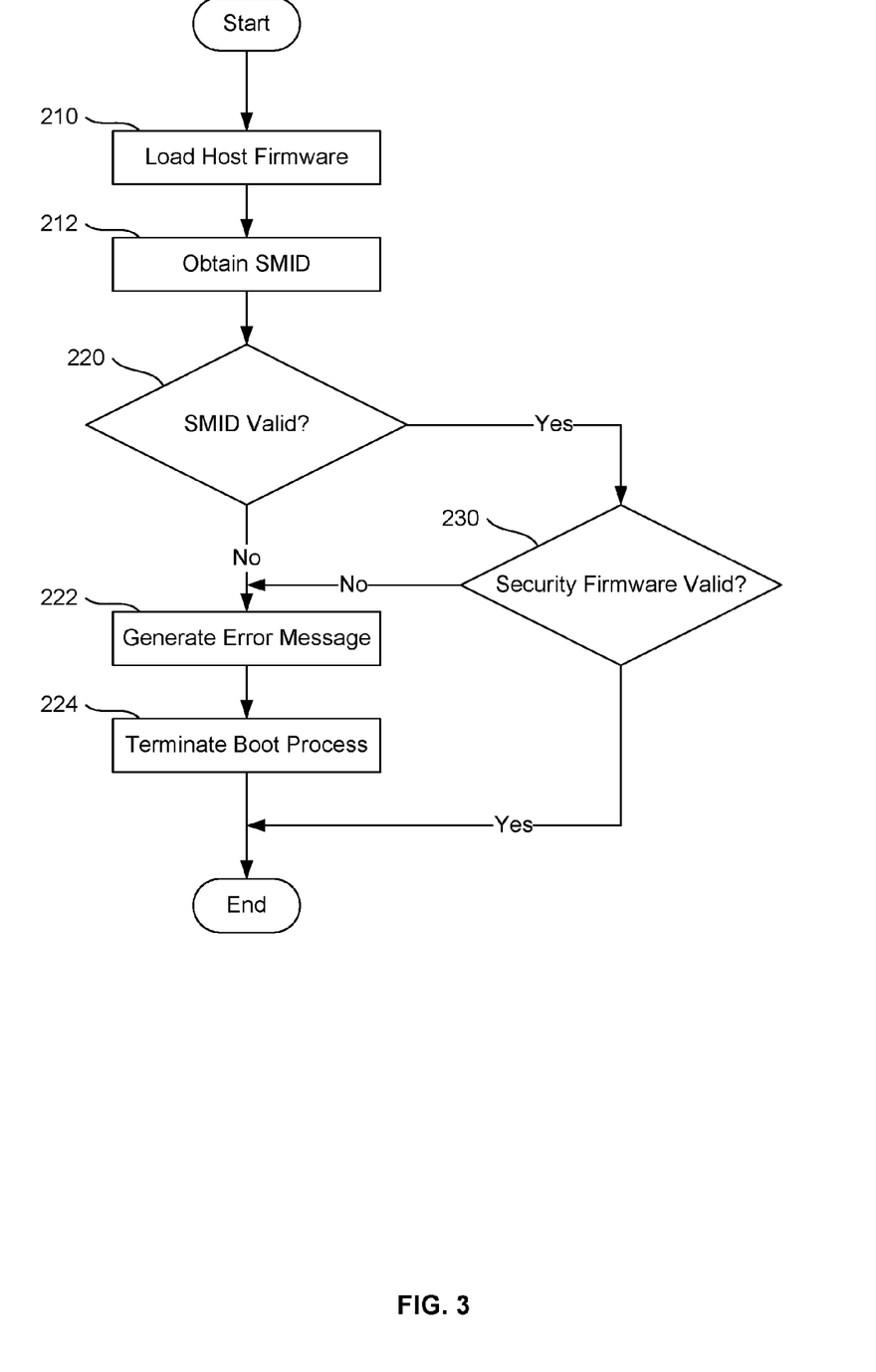
FIG. 3 presents a flowchart of an example process to protect firmware in an embedded system, with at least some operations to be performed by a host module.

FIG. 3 presents a flowchart of an example process to protect firmware in embedded system 10, with at least some operations to be performed by host module 40. That process may start when security module 20 releases the reset signal for host module 40. As shown at block 210, host processor 42 may then load host firmware 52. As shown at block 212, host processor 42 may then execute host firmware 52, which may obtain SMID 29 from security coprocessor 22. The request from host processor 42 for SMID 29 may be referred to as a challenge. In response to that challenge, security module 20 may use one of the shared keys (or a key based on one of those keys) to encrypt SMID 29 before sharing SMID 29 with host module 40.

As shown at block 220, host processor 42 may then determine whether SMID 29 is valid. For instance, host processor 42 may compare the SIMD it received from security module 20 with a SIMD for the authorized security module that was previously stored as part of SPD 58 in NVM 56. If SMID 29 is not valid, host processor 42 may generate an error message and terminate the boot process, as shown at blocks 222 and 224. Thus, SMID 29 provides for reverse coupling from host module 40 to security module 20. As indicated below, security module 20 may use management engine 44 to ensure that if security module 20 is separated or attacked, host module 40 will not work without the valid security module 20.

However, if SMID 29 is valid, host processor 42 may then perform an integrity check on security firmware 32, as shown at block 230. Thus, security module 20 may perform a reverse integrity check of security module 20. If security firmware 32 fails the integrity check, host processor 42 may generate an error message and terminate the boot process, as shown at blocks 222 and 224. However, if security firmware 32 passes the integrity check, security module 20 may complete its boot process and go on to operate in a more or less conventional manner.

Also, in other embodiments, one, some, or all of the operations of FIG. 3 may be performed by management engine 44 instead of host processor 42. Management engine 44 may include a trusted microprocessor, and as indicated above, management engine 44 may implement a CSME, for instance.

Thus, management engine 44 in host module 40 may be tightly coupled to security module 20, to ensure that if an attacker separates security module 20 and host module 40, host module 40 will not work without security module 20. As indicated above, technologies such as PUFs are an option for enforcing such tight coupling.

Security module 20 may also manage firmware updates for some or all of the modules in embedded system 10. For instance, security module 20 may receive an over-the-air update for the firmware for host module 40 (or any other module), and security module 20 may then authenticate that new firmware version to make sure that it came from a trusted source, etc. Security module 20 may then store the new version in embedded memory 30 (or any other suitable location), and security module 20 may store the measurement of the new version in SPD 25. Subsequently, during next reset of the relevant module, security module 20 may copy new firmware to the module, replacing the old version. Thus, security module 20 provides for background updates while host module 40, accelerator 94, and external device 90 are operating, and security module 20 can push an authenticated update during reset of any of the devices or modules controlled by security module 20. Alternatively, rather than waiting for the next boot cycle, security module 20 may decide to reset a slave device dynamically, based on a pertinent security or safety policy. Background updates or dynamic updates may be needed for automotive applications, aviation applications, and other applications. The above approach may even be used to update security firmware 32, thereby changing the security posture of security module 20. For instance, security module 20 may apply an update to security firmware 32 that changes one or more of the security policies enforced by security module 20.

Security module 20 may also safeguard embedded system 10 from bugs. For example, if a new firmware version causes host module 40 (or any other module) to lock up or halt, security module 20 may respond by replacing the new firmware version with the previous version.

In one embodiment, the security module and the host module use one or more anti-replay mechanisms, including without limitation monotonic counters and nonces. Also, the security module may turn off an auxiliary module or a host module if the security module detects a violation of trust or safety.

In one embodiment, the master module includes secure NVM, and the master module uses that secure NVM to store a golden copy of the firmware for one, some, or all of the modules in the embedded system, as well as security settings, metadata, and any other suitable data. If the embedded memory fails, the embedded system may use one or more of the golden copies to reset on or more of the modules to the factory configuration. And to maintain security, the NVM may be accessible only through manual access or through a special encrypted signal.

The present teachings may be used to advantage in many different types of embedded system. For instance, an embedded system for a vehicle may include low power ECUs and sensors (camera, radar, etc.) that do not have robust hardware protection to prevent attackers from manipulate their firmware. An attacker might use a sensor (for example) as a hub to attack and propagate malware further inside the vehicle. However, the present teachings may allow the security module to detect any malware before the embedded system is fully booted, and to eradicate the malware.

The present disclosure explains that security modules and host modules may check the integrity of firmware. In addition or alternatively, security module may check other types of data, including without limitation algorithms, self-test code, data areas, training sets, and images. For instance, an embedded system in a car may save an image showing where the car is parked when the car is turned off. When the car is restarted, the embedded system 10 may compare the current surroundings to the saved image to make sure that cameras, vision coprocessors, and other modules are operating correctly.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, software, firmware, microcode, configuration settings, and other kinds of data. As described above, when the data is accessed by a machine or device, the machine or device may respond by performing tasks, defining abstract data types or low-level hardware contexts, and/or performing other operations. For instance, data storage, random access memory (RAM), and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Any suitable operating environment and programming language (or combination of operating environments and programming languages) may be used to implement components described herein.

Some devices may include software which executes on one or more processors. A device may also include storage and main memory. Software and other data may be copied from the storage into the memory. The processor may then execute the software from memory.

Alternative embodiments also include machine accessible media encoding instructions or control logic for performing the operations described herein. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an ASIC, etc.).

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multiprocessor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, SoCs, wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with protection for firmware. The data processing system comprises (a) a host module comprising a management engine; (b) a security module in communication with the host module, wherein the security module comprises a security coprocessor and a secret identifier for the security module; and (c) at least one machine-accessible medium responsive to the security module. The machine-accessible medium comprises host firmware which, when executed on the host module by the management engine, enables to management engine to determine whether the security module is in communication with the host module, based on the secret identifier for the security module. The machine-accessible medium also comprises security firmware which, when executed on the security module by the security coprocessor, enables the security coprocessor (a) to verify integrity of the host firmware and (b) to prevent the host module from booting with the host firmware in response to a determination that the host firmware has lost integrity.

Example A2 is a data processing system according to Example A1, wherein the host firmware, when executed, enables the management engine to respond to a determination that the security module is not in communication with the host module by preventing the host module from booting successfully.

Example A3 is a data processing system according to Example A1, wherein the host firmware, when executed, enables the management engine (a) to verify integrity of the security firmware for the security module and (b) to prevent the security module from booting with the security firmware in response to a determination that the security firmware has lost integrity. Example A3 may also include the features of Example A2.

Example A4 is a data processing system according to Example A1, wherein the host module comprises a secret identifier for the host module and the security module comprises nonvolatile storage with a secret identifier for an approved host module. The security firmware, when executed, enables the security coprocessor to (a) and receive the secret identifier for the host module from the host module and (b) determine whether the approved host module is in communication with the security module, based on (i) the secret identifier from the host module and (ii) the secret identifier from the nonvolatile storage in the security module. Example A4 may also include the features of any one or more of Examples A2 and A3.

Example A5 is a data processing system according to Example A4, wherein the data processing system comprises at least one communication line to support a network comprising the host module and the security module. The security firmware, when executed, enables the security coprocessor to respond to a determination that the approved host module is not in communication with the security module by performing at least one operation from the group consisting of: (a) causing the host module to reset; (b) causing the host module to be removed from the network; (c) causing diagnostics to be performed on the host module; (d) causing diagnostics to be performed on the security module; (e) causing the host module to be disabled; and (f) causing an error indicator to be presented.

Example A6 is a data processing system according to Example A1, wherein the security firmware, when executed, enables the security module (a) to automatically replace the host firmware with backup host firmware in response to a determination that the host firmware has lost integrity and (b) after replacing the host firmware with the backup host firmware, to cause the host module to boot with the backup host firmware. Example A6 may also include the features of any one or more of Examples A2 through A5.

Example A7 is a data processing system according to Example A1, further comprising at least one external device in communication with the security module, and device firmware for the external device. The security firmware, when executed, enables the security module to check integrity of the device firmware for the external device. Example A7 may also include the features of any one or more of Examples A2 through A6.

Example A8 is a data processing system according to Example A7, wherein the security firmware, when executed, enables the security module to cause the device firmware to be replaced with backup device firmware, in response to a determination that the device firmware for the external device has lost integrity.

Example A9 is a data processing system according to Example A7, wherein the security firmware, when executed, enables the security module to (a) allow the external device to boot before the security module has verified integrity of the device firmware, and (b) cause the external device to execute in a read-only mode until the security module has verified integrity of the device firmware. Example A9 may also include the features of Example A8.

Example A10 is a data processing system according to Example A7, wherein the security firmware, when executed, enables the security module to (a) receive new device firmware for the external device; (b) authenticate the new device firmware; and (c) in response to successfully authenticating the new device firmware, cause the device firmware for the external device to be replaced with the new device firmware. Example A10 may also include the features of any one or more of Examples A8 through A9.

Example A11 is a data processing system according to Example A1, wherein the security firmware, when executed, enables the security module to (a) receive new security firmware; (b) authenticate the new security firmware; and (c) in response to successfully authenticating the new security firmware, replace the security firmware with the new security firmware. Example A11 may also include the features of any one or more of Examples A2 through A10.

Example A12 is a data processing system according to Example A1, wherein the at least one machine-accessible medium comprises nonvolatile memory (NVM) in the security module, and embedded memory outside of the security module. Also, the security firmware resides in the NVM, and the host firmware resides in the embedded memory. Example A12 may also include the features of any one or more of Examples A2 through A11.

Example A13 is a data processing system according to Example A1, wherein the host module comprises a system-on-a-chip (SoC) module, and the security coprocessor comprises a field-programmable gate array (FPGA). Example A13 may also include the features of any one or more of Examples A2 through A12.

Example A14 is a data processing system according to Example A13, further comprising (a) a single integrated circuit that comprises the host module and the security module, and (b) at least one communication line in the single integrated circuit to enable communication between the host module and the security module.

Example B1 is an apparatus to protect firmware in an embedded system. The apparatus comprises at least one non-transitory machine-accessible storage medium comprising security firmware for a security module of an embedded system and host firmware for a host module of the embedded system. The security firmware, when executed, enables the security module (a) to automatically verify integrity of the host firmware and (b) to automatically prevent the host module from booting with the host firmware in response to a determination that the host firmware has lost integrity. The host firmware, when executed by the host module, enables the host module to automatically determine whether an approved security module is in communication with the host module, based on a secret identifier for the approved security module.

Example B2 is an apparatus according to Example B1, wherein the host firmware, when executed by the host module, enables the host module to respond to a determination that the approved security module is not in communication with the host module by automatically preventing the host module from booting successfully.

Example B3 is an apparatus according to Example B1, wherein the host firmware, when executed by the host module, enables the host module (a) to automatically verify integrity of the security firmware and (b) to automatically prevent the security module from booting with the security firmware in response to a determination that the security firmware has lost integrity. Example B3 may also include the features of Example B2.

Example B4 is an apparatus according to Example B1, wherein the security firmware, when executed, enables the security module (a) to obtain a secret identifier for the host module from the host module, (b) to obtain a secret identifier for the approved host module from nonvolatile storage in the security module, and (c) to determine whether the approved host module is in communication with the security module, based on (i) the secret identifier from the host module and (ii) the secret identifier from the nonvolatile storage in the security module. Example B4 may also include the features of any one or more of Examples B2 through B3.

Example B5 is an apparatus according to Example B1, wherein the security firmware, when executed, enables the security module (a) to automatically replace the host firmware with backup host firmware in response to a determination that the current host firmware has lost integrity and (b) after replacing the host firmware with the backup host firmware, to cause the host module to boot with the backup host firmware. Example B5 may also include the features of any one or more of Examples B2 through B4.

Example B6 is an apparatus according to Example B1, wherein the security firmware, when executed, enables the security module to check integrity of device firmware for an external device in the embedded system. Example B6 may also include the features of any one or more of Examples B2 through B5.

Example B7 is an apparatus according to Example B6, wherein the security firmware, when executed, enables the security module to cause the device firmware on the external device to be replaced with backup device firmware, in response to a determination that the device firmware on the external device has lost integrity.

Example B8 is an apparatus according to Example B6, wherein the security firmware, when executed, enables the security module to (a) receive new device firmware for the external device; (b) authenticate the new device firmware; and (c) in response to successfully authenticating the new device firmware, cause the device firmware for the external device to be replaced with the new device firmware. Example B8 may also include the features of Example B7.

Example B9 is an apparatus according to Example B6, wherein the security firmware, when executed, (a) allows the external device to boot before the security module has verified integrity of the device firmware, and (b) causes the external device to execute in a read-only mode until the security module has verified integrity of device firmware for the external device. Example B9 may also include the features of any one or more of Examples B7 through B8.

Example B10 is an apparatus according to Example B1, wherein the security firmware, when executed, enables the security module to (a) receive new security firmware for the security module; (b) authenticate the new security firmware; and (c) in response to successfully authenticating the new security firmware, replace the security firmware for the security module with the new security firmware. Example B10 may also include the features of any one or more of Examples B2 through B9.

Example B11 is an apparatus according to Example B1, wherein the at least one machine-accessible medium comprises nonvolatile memory (NVM) in the security module, and embedded memory outside of the security module. Also, the security firmware resides in the NVM, and the host firmware resides in the embedded memory. Example B11 may also include the features of any one or more of Examples B2 through B10.

Example C1 is a method for protecting firmware in an embedded system. The embedded system comprises a security module and a host module. The method comprises, during a boot process for the security module (a) automatically verifying integrity of host firmware for the host module and (b) automatically preventing the host module from booting with the host firmware in response to a determination that the host firmware has lost integrity. The method further comprises, during a boot process for the host module, automatically determining whether an approved security module is in communication with the host module, based on a secret identifier for the approved security module.

Example C2 is a method according to Example C1, further comprising, in response to a determination that the approved security module is not in communication with the host module, automatically preventing the host module from booting successfully.

Example C3 is a method according to Example C1, further comprising, during the boot process for the host module, automatically verifying integrity of the security firmware for the security module. The method further comprises automatically preventing the security module from booting with the security firmware in response to a determination that the security firmware has lost integrity. Example C3 may also include the features of Example C2.

Example C4 is a method according to Example C1, further comprising (a) obtaining a secret identifier for the host module from the host module; (b) obtaining a secret identifier for the approved host module from nonvolatile storage in the security module; and (c) determining whether the approved host module is in communication with the security module, based on (i) the secret identifier from the host module and (ii) the secret identifier from the nonvolatile storage in the security module. Example C4 may also include the features of any one or more of Examples C2 through C3.

Example C5 is a method according to Example C1, further comprising responding, by the security module, to a problem with the host module by performing at least one operation from the group consisting of (a) causing the host module to reset, (b) causing diagnostics to be performed on the host module, (c) causing diagnostics to be performed on the security module, (d) causing the host module to be disabled, and (e) causing an error indicator to be presented. Example C5 may also include the features of any one or more of Examples C2 through C4.

Example C6 is a method according to Example C1, further comprising (a) in response to a determination, by the security module, that the host firmware has lost integrity, automatically replacing the host firmware with backup host firmware; and (b) after replacing the host firmware with the backup host firmware, causing the host module to boot with the backup host firmware. Example C6 may also include the features of any one or more of Examples C2 through C5.

Example C7 is a method according to Example C1, further comprising (a) during the boot process for the security module, checking integrity of device firmware for an external device in the embedded system; and (b) in response to a determination that the device firmware on the external device has lost integrity, automatically causing the device firmware on the external device to be replaced with backup device firmware. Example C7 may also include the features of any one or more of Examples C2 through C6.

Example C8 is a method according to Example C1, further comprising (a) receiving, at the security module, new device firmware for an external device in the embedded system; (b) authenticate the new device firmware; and (c) in response to successfully authenticating the new device firmware, causing current device firmware for the external device to be replaced with the new device firmware. Example C8 may also include the features of any one or more of Examples C2 through C7.

Example D is at least one machine-accessible medium comprising computer instructions for protecting firmware in an embedded system. The computer instructions, in response to being executed in the embedded system, enable the embedded system to perform a method according to any of Examples C1 through C8.

Example E is an embedded system with technology for protecting firmware. The embedded system comprises (a) a processing element, (b) at least one machine-accessible medium responsive to the processing element, and (c) computer instructions stored at least partially in the at least one machine-accessible medium. The computer instructions, in response to being executed, enable the embedded system to perform a method according to any of Examples C1 through C8.

Example F is an embedded system with technology for protecting firmware. The embedded system comprises means for performing the method of any of Examples C1 through C8.

What is claimed is:

1. A data processing system with protection for firmware, the data processing system comprising:
   a host module comprising a management engine;
   a security module in communication with the host module, wherein the security module comprises a security coprocessor and a secret identifier for the security module;
   at least one machine-accessible medium responsive to the security module;
   host firmware in the machine-accessible medium which, when executed on the host module by the management engine, enables the management engine to determine whether the security module is in communication with the host module, based on the secret identifier for the security module; and
   security firmware in the machine-accessible medium which, when executed on the security module by the security coprocessor, enables the security coprocessor (a) to verify integrity of the host firmware and (b) to prevent the host module from booting with the host firmware in response to a determination that the host firmware has lost integrity.

2. A data processing system according to claim 1, wherein the host firmware, when executed, enables the management engine to respond to a determination that the security module is not in communication with the host module by preventing the host module from booting successfully.

3. A data processing system according to claim 1, wherein the host firmware, when executed, enables the management engine (a) to verify integrity of the security firmware for the security module and (b) to prevent the security module from booting with the security firmware in response to a determination that the security firmware has lost integrity.

4. A data processing system according to claim 1, wherein:
the host module comprises a secret identifier for the host module;
the security module comprises nonvolatile storage with a secret identifier for an approved host module; and
the security firmware, when executed, enables the security coprocessor to (a) and receive the secret identifier for the host module from the host module and (b) determine whether the approved host module is in communication with the security module, based on (i) the secret identifier from the host module and (ii) the secret identifier from the nonvolatile storage in the security module.

5. A data processing system according to claim 4, wherein:
the data processing system comprises at least one communication line to support a network comprising the host module and the security module; and
the security firmware, when executed, enables the security coprocessor to respond to a determination that the approved host module is not in communication with the security module by performing at least one operation from the group consisting of:
causing the host module to reset;
causing the host module to be removed from the network;
causing diagnostics to be performed on the host module;
causing diagnostics to be performed on the security module;
causing the host module to be disabled; and
causing an error indicator to be presented.

6. A data processing system according to claim 1, wherein the security firmware, when executed, enables the security module (a) to automatically replace the host firmware with backup host firmware in response to a determination that the host firmware has lost integrity and (b) after replacing the host firmware with the backup host firmware, to cause the host module to boot with the backup host firmware.

7. A data processing system according to claim 1, further comprising:
at least one external device in communication with the security module; and
device firmware for the external device; and
wherein the security firmware, when executed, enables the security module to check integrity of the device firmware for the external device.

8. A data processing system according to claim 7, wherein the security firmware, when executed, enables the security module to cause the device firmware to be replaced with backup device firmware, in response to a determination that the device firmware for the external device has lost integrity.

9. A data processing system according to claim 7, wherein the security firmware, when executed, enables the security module to:
allow the external device to boot before the security module has verified integrity of the device firmware; and
cause the external device to execute in a read-only mode until the security module has verified integrity of the device firmware.

10. A data processing system according to claim 7, wherein the security firmware, when executed, enables the security module to:
receive new device firmware for the external device;
authenticate the new device firmware; and
in response to successfully authenticating the new device firmware, cause the device firmware for the external device to be replaced with the new device firmware.

11. A data processing system according to claim 1, wherein the security firmware, when executed, enables the security module to:
receive new security firmware;
authenticate the new security firmware; and
in response to successfully authenticating the new security firmware, replace the security firmware with the new security firmware.

12. A data processing system according to claim 1, wherein:
the at least one machine-accessible medium comprises:
nonvolatile memory (NVM) in the security module; and
embedded memory outside of the security module;
the security firmware resides in the NVM; and
the host firmware resides in the embedded memory.

13. A data processing system according to claim 11, wherein:
the host module comprises a system-on-a-chip (SoC) module; and
the security coprocessor comprises a field-programmable gate array (FPGA).

14. A data processing system according to claim 13, further comprising:
a single integrated circuit that comprises the host module and the security module; and
at least one communication line in the single integrated circuit to enable communication between the host module and the security module.

15. An apparatus to protect firmware in an embedded system, the apparatus comprising:
at least one non-transitory machine-accessible storage medium comprising security firmware for a security module of an embedded system and host firmware for a host module of the embedded system;
wherein the security firmware, when executed, enables the security module (a) to automatically verify integrity of the host firmware and (b) to automatically prevent the host module from booting with the host firmware in response to a determination that the host firmware has lost integrity; and
wherein the host firmware, when executed by the host module, enables the host module to automatically determine whether an approved security module is in communication with the host module, based on a secret identifier for the approved security module.

16. An apparatus according to claim 15, wherein the security firmware, when executed, enables the security module (a) to automatically replace the host firmware with backup host firmware in response to a determination that the current host firmware has lost integrity and (b) after replacing the host firmware with the backup host firmware, to cause the host module to boot with the backup host firmware.

17. An apparatus according to claim 15, wherein the security firmware, when executed, enables the security module to check integrity of device firmware for an external device in the embedded system.

18. A method for protecting firmware in an embedded system, the method comprising:
in an embedded system comprising a security module and a host module, during a boot process for the security module (a) automatically verifying integrity of host firmware for the host module and (b) automatically preventing the host module from booting with the host firmware in response to a determination that the host firmware has lost integrity; and
during a boot process for the host module, automatically determining whether an approved security module is in communication with the host module, based on a secret identifier for the approved security module.

19. A method according to claim 18, further comprising:
in response to a determination that the approved security module is not in communication with the host module, automatically preventing the host module from booting successfully.

20. A method according to claim 18, further comprising:
during the boot process for the host module, automatically verifying integrity of the security firmware for the security module; and
automatically preventing the security module from booting with the security firmware in response to a determination that the security firmware has lost integrity.

21. A method according to claim 18, further comprising:
obtaining a secret identifier for the host module from the host module;
obtaining a secret identifier for the approved host module from nonvolatile storage in the security module; and
determining whether the approved host module is in communication with the security module, based on (i) the secret identifier from the host module and (ii) the secret identifier from the nonvolatile storage in the security module.

22. A method according to claim 18, further comprising:
responding, by the security module, to a problem with the host module by performing at least one operation from the group consisting of:
causing the host module to reset;
causing diagnostics to be performed on the host module;
causing diagnostics to be performed on the security module;
causing the host module to be disabled; and
causing an error indicator to be presented.

23. A method according to claim 18, further comprising:
in response to a determination, by the security module, that the host firmware has lost integrity, automatically replacing the host firmware with backup host firmware; and
after replacing the host firmware with the backup host firmware, causing the host module to boot with the backup host firmware.

24. A method according to claim 18, further comprising:
during the boot process for the security module, checking integrity of device firmware for an external device in the embedded system; and
in response to a determination that the device firmware on the external device has lost integrity, automatically causing the device firmware on the external device to be replaced with backup device firmware.

25. A method according to claim 18, further comprising:
receiving, at the security module, new device firmware for an external device in the embedded system;
authenticate the new device firmware; and
in response to successfully authenticating the new device firmware, causing current device firmware for the external device to be replaced with the new device firmware.

\* \* \* \* \*